United States Patent [19]

Rukovena, Jr.

[11] Patent Number: 4,740,334

[45] Date of Patent: Apr. 26, 1988

[54] TOWER PACKING ELEMENT WITH EMBOSSED SURFACES

[75] Inventor: Frank Rukovena, Jr., Tallmadge, Ohio

[73] Assignee: Norton Company, Worcester, Mass.

[21] Appl. No.: 55,579

[22] Filed: May 29, 1987

[51] Int. Cl.$^4$ ............................................. B01F 3/04
[52] U.S. Cl. ..................................... 261/112; 261/113
[58] Field of Search .................. 261/112.2, 112.1, 113

[56] References Cited

U.S. PATENT DOCUMENTS

| | | | |
|---|---|---|---|
| 2,047,444 | 7/1936 | Stedman | 261/94 |
| 3,235,234 | 2/1966 | Beaudoin | 261/112.2 |
| 3,396,515 | 8/1968 | Wright | 261/113 |
| 3,475,012 | 10/1969 | Britton et al. | 261/112 |
| 4,186,159 | 1/1980 | Huber | 261/112.2 |
| 4,296,050 | 10/1981 | Meier | 261/112.2 |
| 4,374,542 | 2/1983 | Bradley | 261/112.2 |
| 4,604,247 | 8/1986 | Chen et al. | 261/112.2 |
| 4,670,196 | 6/1987 | Hsia | 261/112.2 |
| 4,673,538 | 6/1987 | Klauss | 261/112.1 |

FOREIGN PATENT DOCUMENTS

| | | |
|---|---|---|
| 0190435 | 12/1985 | European Pat. Off. |
| 3222892 | 12/1983 | Fed. Rep. of Germany ... 261/112.2 |
| 1406727 | 6/1965 | France ........................ 261/112.2 |

Primary Examiner—Tim Miles
Attorney, Agent, or Firm—Walter Fred

[57] ABSTRACT

An efficient embossed packing element for exchange columns is made up of a plurality of preformed embossed vertical sheets, each having a plurality of elongated inclined troughs including converging embossed sidewalls, valleys, and ridges extending between upper inlet edges and lower outlet drip edges and projecting alternately outwardly from one side and then the opposite side of the median plane of each sheet. Projecting from the converging sidewalls of the troughs are a plurality of hollow protuberances with perforated peaks including small openings surrounded by edges of the wall about the peaks. The embossed sheets are arranged so that the inclined rows of the embossed troughs in adjacent sheets are oppositely inclined and in crisscrossing relation to the inclined rows of the adjacent sheet of the packing element causing frequent changes in direction of liquid flow and whereby both embossed sides of each sheet are more easily and uniformly wetted by the frequently diverted liquid flowing downwardly over the surfaces thereof.

21 Claims, 1 Drawing Sheet

U.S. Patent  Apr. 26, 1988  4,740,334

TOWER PACKING ELEMENT WITH EMBOSSED SURFACES

TECHNICAL DISCLOSURE

An embossed multiple corrugated sheet-type packing element with parallel rows of elongated U or V-shaped ridges and channels disposed at an angle to a vertical plane. The ridges and channels of adjacent sheets contact one another, are oppositely inclined and cross one another at a predetermined angle. The opposite inner and outer surfaces of the inclined channels have alternating rows of perforated protrusions which increase the efficiency of the packing element.

BACKGROUND OF THE INVENTION

1. Field of the Invention

The invention relates to a packing element for use in fluid-fluid or liquid-gas contact apparatus and particularly to a multiple corrugated sheet-type packing element wherein the opposite surfaces or sides of the inclined V-shaped channels or troughs of each sheet are embossed with a specific pattern of perforated protrusions to increase efficiency of the packing element.

2. DESCRIPTION OF THE PRIOR ART

The prior art discloses various types of packing elements with protrusions and patterns thereof applied to the inclined sides and surfaces of both V and U-shaped corrugated sheet-type packing elements and other shapes of preformed elements for improving the mass transfer performance of fluid-fluid and liquid-gas contact apparatus.

Such prior embossed, textured or fluted packing elements with hollows and protuberances of various configurations are disclosed in U.S. Pat. Nos. 2,047,444; 3,475,012, EPO patent application No. 0 190 435; U.S. Pat. Nos. 4,186,159, 4,296,050, 4,604,247. However, the present invention is directed to improving the performance and efficiency of preformed sheet type packing elements and in particular the packing element of the type disclosed in U.S. Patent application Ser. No. 775,919, new Pat. No. 4,670,196. The subject matter of said patent application is hereby incorporated by reference and to which reference may be had for details not disclosed herein.

SUMMARY OF THE INVENTION

A packing element comprising a plurality of relatively thin preformed embossed or textured sheets fastened together in any suitable manner. Each of the sheets has opposite top, bottom, and side edges and adjacent parallel inclined rows of elongated V-shaped inclined channels or troughs with embossed side walls and ridges projecting alternately outwardly from one and then the opposite side of the midplane of the sheet. Preferably, each inclined row has a plurality of adjoining relatively shorter elongated generally V-shaped inclined troughs and ridges projecting alternately from each side of and the midplane of the sheet. Hence, each inclined row of troughs provides a series of elongated inclined ridges spaced by the intervening elongated inclined bottoms or valleys of the troughs between the ridges.

Each inclined trough has an upper entrance adjacent its upper edge and an outlet at its lower drip edge. The upper edge and entrance of one trough is opposite to and adjacent the lower edge and outlet of the adjoining trough in each row thereof. The lowest points of the upper edge and lower drip edge of all inclined V-shaped troughs in the sheet are substantially in the same horizontal and vertical plane. Adjacent sheets of the packing element are substantially identical and arranged so the inclined rows of troughs of one sheet are inclined at the same angle but opposite to and criss-cross the inclined rows of the other sheet.

The inclined relatively thin sidewalls of each of the troughs are embossed or textured so as to provide a series of adjacent rows of perforated cone shaped protuberances or protrusions projecting alternately from each opposite side of the sidewall and separated by rows of perforated hollow cone shaped cavities. Thus, the embossed inclined side wall of the alternating ridges and valleys of the troughs in addition to the upper edges, lower drip edge, entrance and outlet of the adjoining troughs increases the surface area and more uniformly distributes and more frequently changes the direction of liquid flow over the surfaces of each and between the sheets of the packing element. Hence the embossed inclined sidewall of the troughs of each of the sheets increases the performance and efficiency of the packing element.

DESCRIPTION OF THE PREFERRED EMBODIMENT(S)

Figure 1:
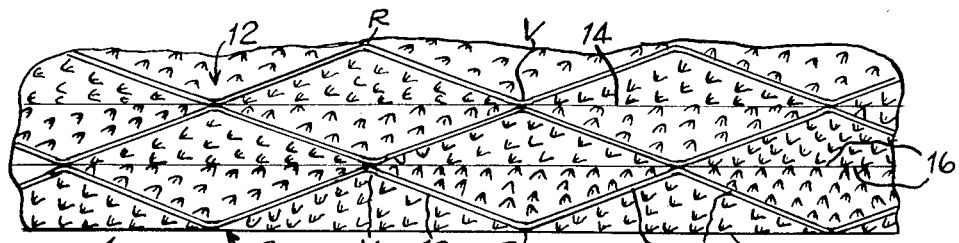
FIG. 1 is a top view of a portion of a number of assembled embossed sheets of the packing element of the invention.
Figure 2:
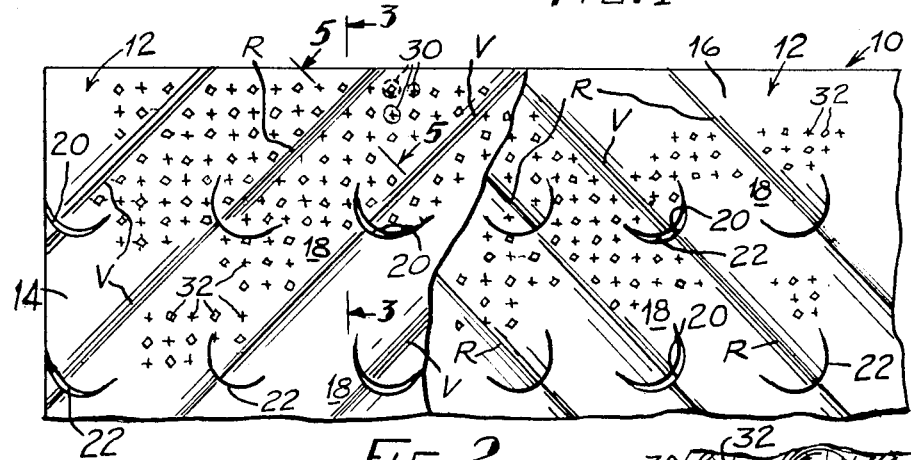
FIG. 2 is a partial front or side view of a portion of adjacent embossed sheets of the packing element as shown in FIG. 1.

Referring to FIGS. 1 and 2, there is shown a portion of a tower packing element 10 of predetermined thickness, height and width, or diameter, comprised of a number of identical preformed and embossed sheets 12 of suitable relatively thin metal or plastic material assembled together in an alternating manner. Each preformed embossed or textured sheet or layer 12 has an embossed front side 14 and an embossed opposite back side 16. Projecting alternately along the rows, from front and back sides 14 and 16 are a plurality of elongated inclined generally V-shaped troughs 18 of substantially identical size and shape. Each of the troughs have inclined walls with embossed or textured outer inclined trickle surfaces or sides converging to and defining an elongated inclined ridge R and embossed or textured inner inclined trickle sides or surfaces converging to an elongated inclined valley V opposite the ridge R. Hence, each of the adjacent horizontal and inclined rows of elongated inclined V-shape troughs 18 has alternating inclined ridges and valleys on each of the embossed or textured sides 14 and 16 and median plane of the sheet, layer, or plate 12 of the packing element 10.

The elongated inclined V-shaped troughs 18 are provided with upper concave edges 20 about entrances or inlets to the valleys V and longitudinally projecting lower convex drip edges 22 about lower outlet ends thereof. The upper edges 20 and the lower drip edges 22 of adjacent V-shape portions in the inclined rows are of substantially the same complimentary shape and depth. Each pair of adjacent upper and lower edges 20 and 22 extend from lower midpoints thereof and upwardly along both sides of the ridges and valleys to opposite upper ends that converge at junctions located between adjacent ridges and valleys and near the median plane of the sheet 12.

Alternatively, the cross-sectional shape of the inclined troughs 18 may be in the form of a circular segment with curved surfaces, curved valleys and ridges, or a combination of straight sides, diverging from a narrow flat or arcuate apex or ridge. Also the curved upper and lower edges 20 and 22 may be V-shaped or have serrated straight or curved edges.

It can also be seen that the elongated inclined V-shape troughs 18 are arranged on the sheet in adjacent vertical, horizontal and inclined rows and that the lowest point of the upper edges 20 and lower drip edges 22 lie on a single plane and at the intersection of the three horizontal, inclined and vertical planes.

The embossed sheets 12 of the packing element 10 are preferably preformed to identical size and shape and assembled so that every other sheet is turned from side to side 180° so the backside 16 of adjacent sheets are together back to back. Thus, the elongated moderately inclined V-shaped troughs 18, ridges R and valleys V, are oppositely inclined and cross those of the adjacent sheet, while the upper edges 20 and lower drip edges 22 remain substantially at the same height and horizontal plane as those of the adjacent sheet or layer.

Figure 3:
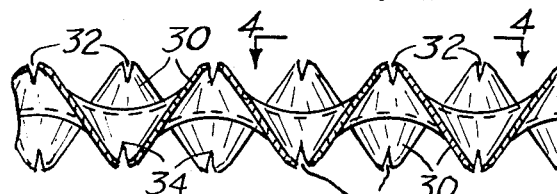
FIG. 3 is a vertical cross sectional view taken on line 3—3 of FIGS. 2 and 4 through a portion of the embossed inclined side wall portion of an inclined trough.
Figure 4:
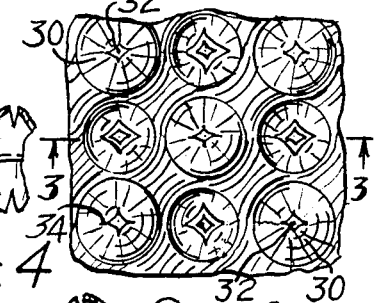
FIG. 4 is a top view of a portion of the embossed sidewall taken on line 4—4 of FIG. 3
Figure 5:
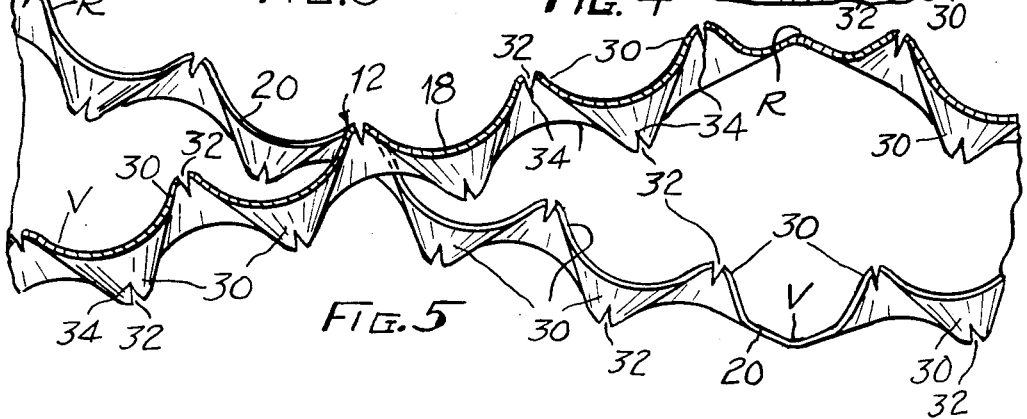
FIG. 5 is a transverse cross-sectional view taken on line 5—5 of FIG. 2 through a portion of one of the embossed inclined sidewall of one of the troughs in adjacent inclined rows of troughs and shows the entrances and upper edge of the lower trough in each of the adjacent inclined rows of troughs.

Referring to FIGS. 3, 4, and 5, it can be seen that the embossed or textured sheets 12 have a plurality of rows of generally hollow cone shaped protuberances or protrusions 30 projecting alternately from each of the sides 14 and 16 and median plane of the embossed sheet 12. Each of the cones or hollow protuberances 30 has a perforated peak with a slit or perforation 32 therein extending from the inner surface to the outer surface portion of the peak. The perforated cones are, as seen in FIGS. 2, 3, and 4, arranged in vertical or horizontal rows and wherein the cones project alternately from one side and then the other side of the medium plane of the sheet 12. Hence, as seen from each side of the sheet, (FIG. 3) each pair of upwardly or outwardly projecting cones 30 is separated by an oppositely or downwardly projecting cone 30. However, rows of upwardly projecting cones separated by rows of downwardly projecting cones may be arranged to extend parallel to one another and either parallel or at right angles to or at a slight angle to elongated ridges R in each inclined row of the troughs 18.

As seen in FIG. 4 the outer exit end of the perforations 32 in the peaks of the upwardly projection cones 30 are smaller in area and size than the inner larger entrance end of the downwardly projection cone 30. Hence, the perforated peaks of the cones 30 are pierced and slit by die means forming and entering the cones 30 from inside and toward the outer peak side of the hollow cones.

In FIG. 5 there is shown in cross section a view looking down inclined rows of adjacent troughs 18 and showing the embossed inclined sidewall with protrusions 30 therein extending from the ridge R on the right hand side to the adjacent valley on the left side of FIG. 5. Looking down the rows of inclined troughs one can see the upper edges 20 at the inlets or entrances to both the next or adjoining lower troughs 18 in adjacent inclined rows thereof. The embossed inclined sidewall of the adjacent lower troughs 18 extend from the ridge R of the left hand trough and downwardly to the adjacent valley V on the right hand side. Hence the valleys V and Ridges R alternate across the sheets 12 and along the inclined rows of troughs 18.

The hollow cone shaped protrusions 30 may project approximately from about 1/16" (1.6 mm) above the opposite sides 14 and 16 of the sheet 12 and up to ⅛" (3.1 mm) above the median plane of the wall thickness of the sheet 12. The base circle or size of the base of each hollow cone at the median plane of the wall thickness of the sheet 12 is approximately ⅛" (3.1 mm) in diameter. Also the cone shaped protrusions are arranged with the centers of their peaks aligned in rows spaced approximately ¼" (6.2 mm) apart on each side of the sheet 12 and about ⅛ (3.1 mm) from the centers of the peaks of an adjacent row of oppositely projecting protuberances 30 projecting alternately from the opposite side of the sheets 12.

The perforation 32 in the bottom and peak of each cone shaped protrusion 32 is formed by slightly slitting, piercing, or stretching the metal until it ruptures and provides the slight opening 32 with protruding jaggered sharp edges. Thus, from the peaks, the apertures 32 may provide two, three, or four exposed edges that converge to a corresponding number of convergent points or places 34 where the openings or slits 32 become smaller, converge, and end on the cone wall, a slight distance from the peaks.

The aligned rows of the cone shaped protrusions are substantially parallel to each other and situated either parallel to or at a slight angle to the inclined ridges of the inclined channels or corrugation of the sheet. Rows of protrusions 30 on each side of the sheet will also be at an angle to a vertical plane and the vertical down flow of the fluid or liquid in the tower.

The assembled sheets 12 may be fastened together by either banding the entire assembly, by welding or fastening adjacent embossed sheets 12 together with conventional screws, bolts, or rivets at several places where the oppositely inclined elongated ridges of adjacent sheets contact and cross one another at approximately a 90° angle.

As a result the adjacent embossed sheets contact one another only at the crossing mid-points of the ridges R which now face each other and define the back sides 16 of the sheets and thereby provide horizontal rows of facing criss-crossing embossed valleys V between the facing criss-crossing inclined embossed ridges R and alternating vertical rows of the facing criss-crossing ridges R and valleys V between adjacent sheets.

Typically, the inclined rows of the embossed troughs 18 are inclined from 30° to 60° but preferrably 45° and spaced about 1" (2.54 cm) apart. The elongated troughs have a length of about 1¾" (4.44 cm) but may be longer along the ridge between the upper and lower drip edges and a depth of about 0.394" (1 cm) between the ridge and valley of adjacent troughs 18.

The embossed or textured sheets 12 may be molded of plastic material but are preferably made by conventionally die stamping out an initially thin flat sheet of a metal such as copper, stainless steel, monel metal, carbon steel, or aluminum 0.010 to 0.050 (0.254 to 1.27 mm) thick. Firstly, the entire area of both sides of the initially flat sheet is embossed by die forming, drawing and piercing the hollow protrusions formed therein. Thereafter, the rows of inclined troughs, channels, or corrugations, are die formed in the previously embossed sheet. Depending upon the thickness of each embossed sheet 12 a typical packing element 10 will comprise anywhere from 10–40 sheets or layers 12 and a height and width which allows it to be inserted through the conventional 18"×18" manway in the column or tower wall.

In operation the liquid is distributed over and flows downwardly over both embossed sides of each sheet 12 of the packing 10 while the gas or exchange medium flows upwardly and makes contact and exchange with the liquid on the embossed surfaces wetted by the liquid. The liquid flows over the inclined embossed surfaces, ridges, around and through the cones, and from the drip edges on both sides of the sheet, and is frequently caused to change direction onto surfaces of the same or adjacent sheets. Thus, the liquid flow is frequently diverted and more uniformly distributed on the embossed surfaces of the sheet and has a surprisingly acceptable pressure drop.

It is obvious that the size and shape of the embossed sheets, hollow protrusions and troughs, angles of inclination of the rows of inclined troughs and protrusions and arrangement of the embossed sheets, protrusions and troughs relative to those of adjacent sheets of the packing element can be varied to suit different applications.

For example, the angle of inclination of the inclined rows of troughs, channels or corrugations and the protuberances thereon, may vary from those of adjacent sheets, may criss cross the inclined rows of adjacent sheets at angles other than 90°, the upper and lower drip edges of adjacent sheets can be located at different heights and in different planes. Also, the longitudinal length of the elongated inclined troughs, ridges and valleys may be varied from sheet to sheet or in different horizontal rows and inclined rows of the same sheet.

The described embossing of the mass transfer packing according to the invention and operating in a countercurrent or co-current mode will enhance a structured packing's mass transfer performance and operating characteristics in the following ways:
1. increases liquid holdup
2. causes liquid mixing
3. causes liquid spreading
4. increases interfacial surface area
5. enables the liquid to wet both sides of the sheet from one side by use of capillary action
6. causes rippling of the liquid film surface
7. creates high and low pressure zones over the surface of the liquid holdup which enhances liquid mixing
8. exposes both sides of the liquid droplets being held up
9. creates pockets and slits in which liquid can be held up by surface tension effects The protrusions with slots or holes in the bottom and peaks thereof can be on a square or triangular pitch and project out from both sides of the sheet, thus creating a shape on each side of the sheet like mountains or cones standing in a row with valleys between. The protrusions on one side of the sheet causes liquid flowing down the valleys to be divided as it flows around a protrusion in its path. The main force involved here in making the liquid flow is gravity, but depending upon the protrusion spacing and size, it could be capillary action. The splitting and mixing around the protrusions is very important to maintain uniform liquid composition which prevents equilibrium pinching and thereby increases efficiency.

On a larger scale, it is desirable to have diagonal movement of the liquid from the normal vertical downward path across the sheet. This causes liquid mixing on a large scale across the whole sheet. The lateral movement of the liquid across the sheet is caused by orienting the protrusion pattern at an angle to the vertical so that the liquid is directed from the normal downward direction caused by gravity.

The inside of the protrusions create pockets and liquid conducting channels for holding liquid droplets. The size and spacing of the protrusions forming these pockets control the number of droplets held up and therefore is one of the controlling factors of the amount of liquid held up. The greater the amount of liquid held up the more time available for the liquid to reach equilibrium with the gas phase thus enhancing efficiency. This is particularly important in liquid film controlled systems or systems with slow liquid phase reaction and at lower liquid-gas flow rates.

The opening in the bottom and peak of every hollow protrusion permits liquid from one side of the sheet to pass to the other side of the sheet by capillary action. This causes enhanced mass transfer in a number of ways. First, as liquid flows across the sheet on one side, some portion of the liquid also passes through the sheet thus wetting both surfaces and thereby increasing the wetted surface area available for mass transfer. Secondly, this increased wetting of the sheet's surface thins the liquid film, which cuts down the length of the diffusional path a molecule must take to reach the gas liquid interface and thereby decreasing the time required to reach equilibrium with the gas phase (i.e. better efficiency). Not being able to efficiently wet both sides of the sheet from one side is a major flaw in existing structured packing.

As the gas flows across the protrusions on the sheet surface, it creates high and low pressure zones on the surface of the liquid flowing over the protruded sheet. This effect causes rippling and wave action much in the same manner the wind causes waves on the surface of a body of water. The undulating surface caused by the protrusions also enhances this rippling action because the thickness of the flowing liquid layer is changing as the liquid passes from one liquid pool to the next. This effect is commonly seen when a wave on the surface of a lake moves towards shore the top of the wave starts to move faster because of increasing drag at the bottom of the liquid wave layer. In short, the shape of the perforated hollow protrusions and the packing of the invention covers:

(1) increased liquid holdup by droplets being held in the hollows of the protrusions;
(2) liquid mixing is enhanced across the sheet because the liquid is directed laterally by the valleys created by the rows of protrusions;
(3) liquid spreading is enhanced by the directional channels created by the protrusions and by passing liquid through the sheet to the other side through the opening in the protrusion;
(4) the effective wetted surface area is enhanced because of the complete wetting of both sides of the sheet and the liquid spreading described above;

(5) the ability of this shape to wet both sides of the sheet also assures a more complete uniformity of liquid composition on both sides of the sheet as well as the liquid spreading;

(6) the rippling effect caused by this shape causes increased mixing within the liquid film;

(7) the turbulence of the gas stream passing over the surface of the liquid film causes mixing of both the liquid and gas phase boundary layers thus enhancing transfer;

(8) the ability of the liquid to move from one side of the sheet to the other exposes both sides of the droplets being held up in the protrusions for mass transfer, and (9) the pockets and slits created by this invention provides the means of taking full effect of the surface energy properties between the liquid and the sheet to increase liquid holdup.

The preshaping and embossing of the basic sheet or foil according to this invention can be used to provide any of the corrugated structured packings or grid type packings presently known with the perforated hollow protrusions or protuberances disclosed hereinabove.

A comparison was made between the embossed packing of the invention and the state-of-the-art corrugated-sheet type packing with textured or fluted surfaces, which are commercially available at this time.

The tests were conducted under the same conditions in a 15" (38.1 cm) diameter distillation tower packed to a depth of 10 ft. (3.048 m). A mixture of isooctane and toluene was fed into the packing at a pressure of 100 mm of mercury and 740 mm of mercury.

The results of the tests indicate that at high liquid-gas capacity avove a CS of 0.1 the embossed packing of the invention maintained a desired low pressure drop per theoretical plate, and 15% average greater maximum capacity than the state-of-the-art corrugated-sheet type packing with textured or fluted surfaces. At lower liquid-gas capacities below a CS of 0.1 to 0.12 the embossed packing of the invention had an improving HETP and was increasing efficiency while the present state of the prior art embossed or fluted packings were losing efficiency. The embossed packing of the invention can operate with 53% of the minimum liquid rate of the present state of the prior art embossed or fluted packings. The capability of the embossed elements of the invention extends the operating range (turn down ratio) 9/1 (min CS to Max CS) compared to a 3/1 for a typical of the prior art embossed or fluted packing. There are indications from the test data that the low end liquid rate of the invention has not yet been reached.

The embossed packing of the invention was also compared to a similar smooth and non-embossed packing element constructed according to and disclosed in copending application Ser. No. 775,919. At low (less than 2 gallons per mixture per square foot) liquid and gas flow capacities below a CS of 0.13 the embossed packing element was more efficient and had a lower HETP. At higher liquid gas flow capacities the performance of embossed packing element was more constant (non-changing efficiency) and more efficient than the similar smooth non-embossed packing element. Thus, the tests indicate that the prior art embossed and nonembossed packing element of the invention gained efficiency particularly at minimum low liquid or gas flow capacities. The embossed packing element of the invention has a 40% wider operating range (turn down ratio) than the nonembossed elements of the copending application Ser. No. 775,919. The embossed elements can operate efficiently with 52% of the minimum liquid rate of the nonembossed packing.

As many modifications of the packing element are possible, it is to be understood that the embodiment disclosed is merely an example thereof, and that the invention includes all modifications, embodiments, and equivalents thereof, falling within the scope of the appended claims.

I claim:

1. An embossed packing element for an exchange column comprising:
   a plurality of preformed embossed sheets of predetermined size and wall thickness situated adjacent one another and each preformed sheet having
      a plurality of elongated inclined troughs including elongated ridges and valleys on each side of the preformed sheet and disposed at an angle opposite to and crossing the elongated inclined troughs, ridges, and valleys of an adjacent sheet of the packing element and each inclined trough having
         an elongated valley on one side and an elongated ridge on an opposite side of the preformed sheet,
         converging inclined sidewalls and surfaces extending upwardly to the elongated ridge from bottoms of the valleys of adjacent elongated inclined troughs, and
      a plurality of hollow protuberances with perforated peaks projecting a predetermined distance from and beyond each side of the converging inclined side walls and surfaces of the inclined trough and each perforated peak having
         a relatively small opening extending through the peak and surrounded by edges of a portion of a wall about the peak.

2. An embossed packing element according to claim 1 wherein the plurality of elongated inclined troughs are situated in a plurality of inclined rows of elongated inclined troughs with alternating elongated valleys and elongated ridges of the troughs in each row on opposite front and back sides of each preformed embossed sheet, and each trough having
   an upper edge about an inlet to each trough, and a lower drip edge about an outlet end of each trough and disposed adjacent the upper edge and inlet of an adjacent lower inclined trough on the opposite side of the preformed embossed sheet and in the same inclined row of troughs.

3. An embossed packing element according to claim 2 wherein the upper edge and lower drip edge each have a low point from which they extend upwardly to high points on opposite sides of the inclined ridge.

4. An embossed packing element according to claim 3 wherein the upper edge and the lower drip edge are curved.

5. An embossed packing element according to claim 2 wherein the inclined troughs are also arranged in a plurality of adjacent horizontal rows with valleys and ridges thereof alternating across each side of the sheet and with the lower drip edges of the inclined troughs in each horizontal row substantially aligned and lying in a single substantially horizontal plane.

6. An embossed packing element according to claim 2 wherein the inclined troughs are also arranged in vertical rows on each side of the sheet and with the lower drip edges of each of the inclined troughs in each vertical row substantially aligned and lying in a single substantially vertical plane.

7. An embossed packing element according to claim 2 wherein the inclined rows of elongated inclined troughs are generally parallel to one another and inclined at an angle of from 30 to 60 degrees from a horizontal plane.

8. An embossed packing element according to claim 2 wherein the inclined ridges of the troughs in each of the inclined rows lie in substantially the same inclined plane.

9. An embossed packing element according to claim 2 wherein the troughs on both opposite sides of the sheet are of substantially identical size and shape and protrude outwardly substantially the same depth from a median plane of the sheet.

10. An embossed packing element according to claim 2 further comprising:
fastening means for holding the sheets together.

11. An embossed packing element according to claim 2 wherein the lower drip edge of one trough and the upper edge of an other adjacent trough in the same inclined row extend inwardly from the ridges on opposite sides of the sheet, converge toward and join one another at high points located on opposite sides of the sheet and near a median plane of the sheet.

12. An embossed packing element according to claim 3 wherein the low points of the lower drip edges on each of the inclined troughs in each inclined row of each sheet of the packing element is situated substantially at the intersection of inclined, horizontal and vertical planes.

13. An embossed packing element according to claim 1 wherein each preformed embossed sheet of the packing element is formed from sheet metal selected from a group consisting of copper, aluminum, stainless steel, carbon steel, monel metal, and alloys thereof.

14. An embossed packing element according to claim 1 wherein the perforated peaks of the hollow protuberances have relatively small polygonal shaped slits surrounded by outwardly projecting edges.

15. An embossed packing element according to claim 1 wherein the hollow protuberances are generally cone shape and each projects from a larger inner open base end at one side of the sheet to the smaller perforated outer peak on an opposite side of the sheet.

16. An embossed packing element according to claim 1 wherein the hollow protuberances are arranged in a plurality of rows extending generally parallel to the inclined ridges of the troughs and at an angle to a vertical plane of the exchange column, the packing element and vertical flow of liquid therethrough.

17. An embossed packing element according to claim 1 wherein the hollow protuberances are arranged in rows of alternating perforated outer peaks and opposite inner open base ends of the protuberances in each row lying in the same plane and inclined at an angle to the ridges.

18. An embossed packing element according to claim 2 wherein the perforated peaks of the hollow protuberances have relatively small polygonal shaped slits surrounded by outwardly projecting edges.

19. An embossed packing element according to claim 2 wherein the hollow protuberances are generally cone shape and each projects from a larger inner open base end at one side of the sheet to the smaller perforated outer peak on an opposite side of the sheet.

20. An embossed packing element according to claim 2 wherein the hollow protuberances are arranged in a plurality of rows extending generally parallel to the inclined ridges of the troughs and at an angle to a vertical plane of the exchange column, the packing element and vertical flow of liquid therethrough.

21. An embossed packing element according to claim 2 wherein the hollow protuberances are arranged in rows of alternating perforated outer peaks and opposite inner open base ends of the protuberances in each row lying in the same plane and inclined at an angle to the ridges.

* * * * *